Figure 1:
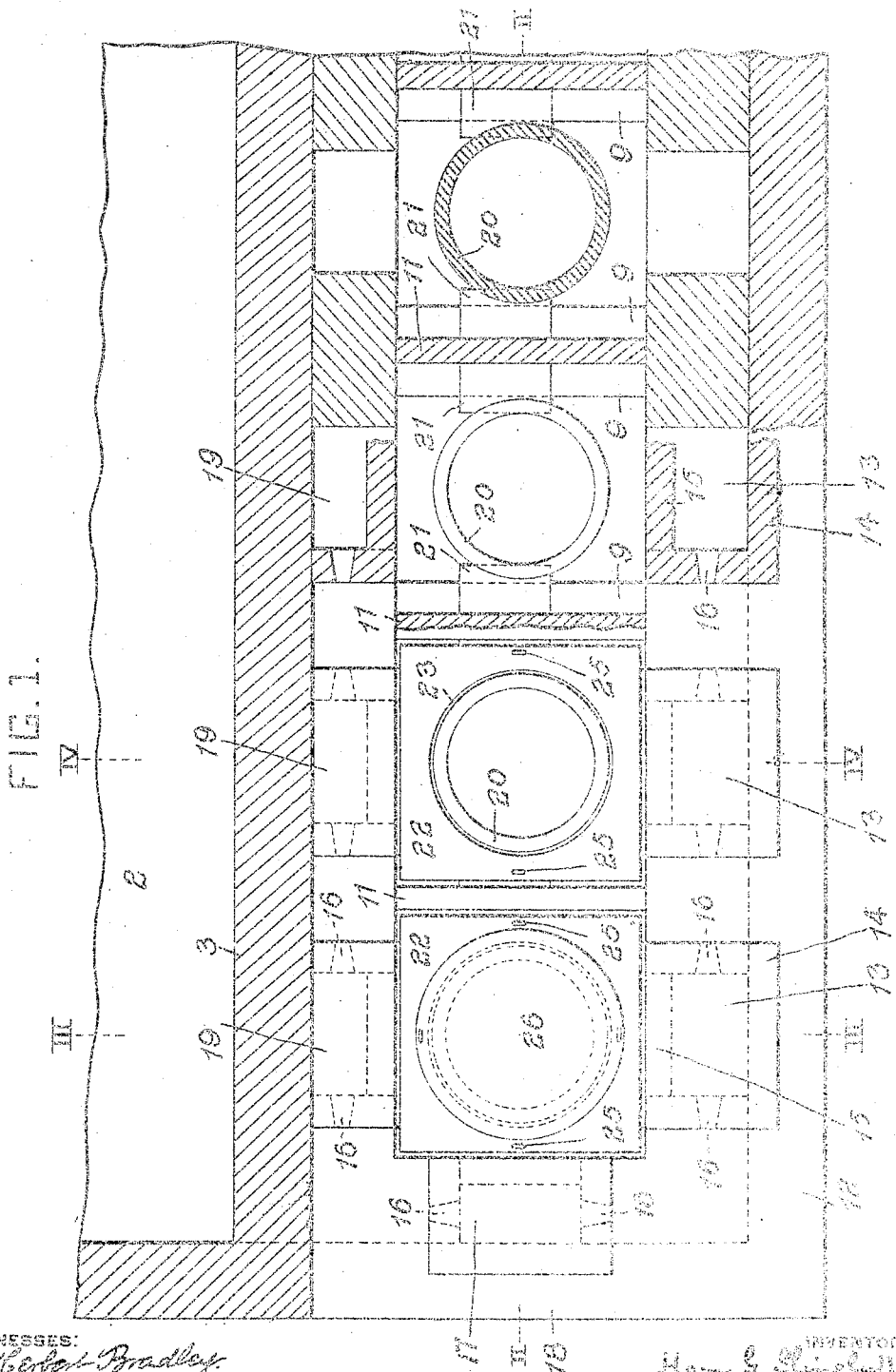

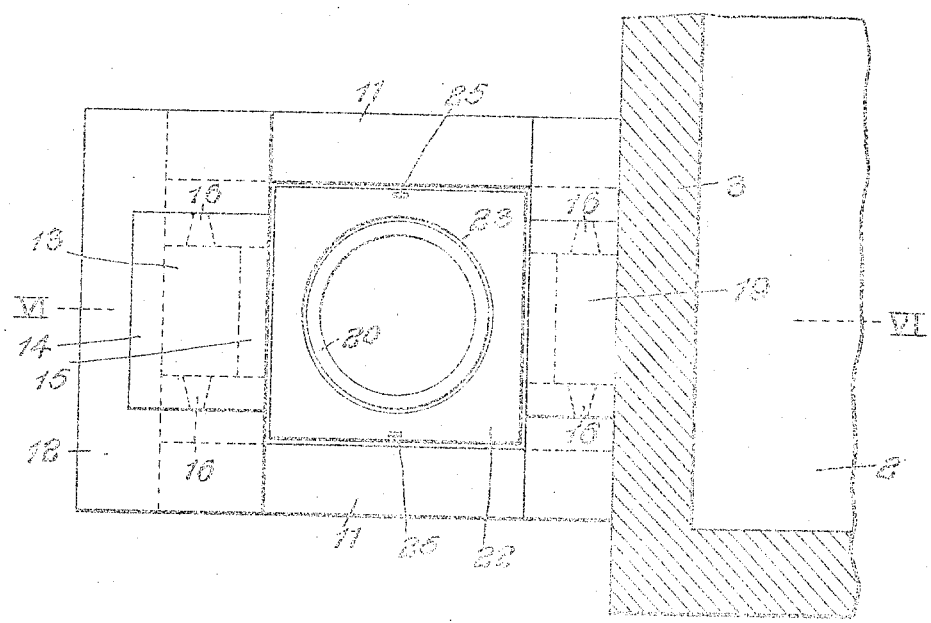
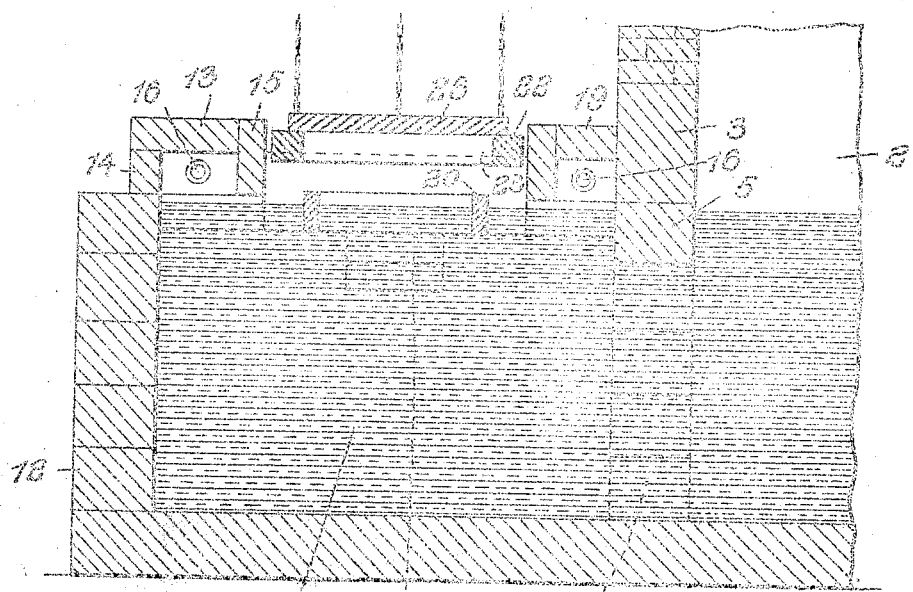

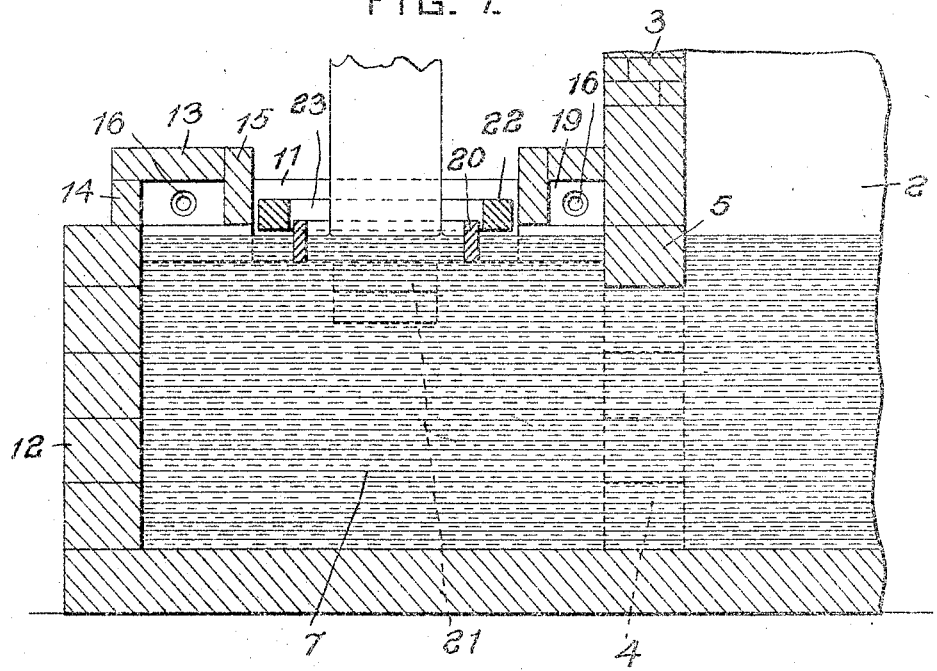
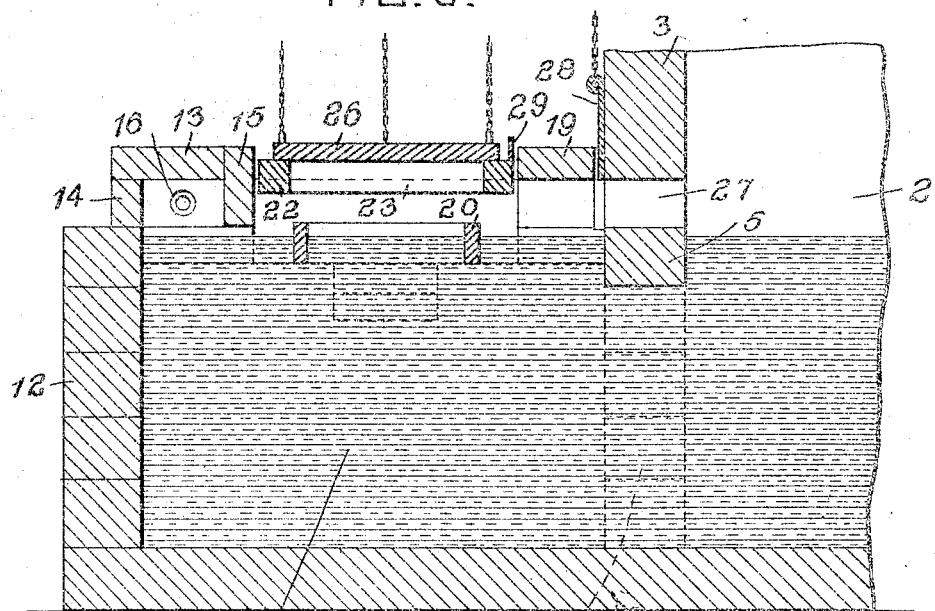

UNITED STATES PATENT OFFICE.

HARRY G. SLINGLUFF, OF ALLEGHENY, PENNSYLVANIA, ASSIGNOR TO PITTSBURGH PLATE GLASS COMPANY, A CORPORATION OF PENNSYLVANIA.

MANUFACTURE OF GLASS ARTICLES.

958,840.

Specification of Letters Patent. Patented May 24, 1910.

Application filed December 3, 1907. Serial No. 404,931.

*To all whom it may concern:*

Be it known that I, HARRY G. SLINGLUFF, residing at Allegheny, in the county of Allegheny and State of Pennsylvania, a citizen of the United States, have invented or discovered certain new and useful Improvements in the Manufacture of Glass Articles, of which improvements the following is a specification.

The invention relates to the drawing of glass articles from a body of molten glass, and consists in the improvements hereinafter described whereby I am enabled to draw directly from the deep body of glass contained in the melting-tank, or a reservoir of substantially equal depth in communication therewith, so that the ladling or flowing of small quantities of glass into pots, hearths, or other shallow receptacles, as now commonly practiced, may be obviated, and the manufacture therefore carried on more economically and expeditiously. By reason of the practical uniformity of the deep body of glass from which the articles are drawn, a better and more uniform product is also attained.

In the methods of drawing glass which have heretofore been commercially practiced, the article has been drawn from a comparatively small quantity of glass, about sufficient for a single drawing, contained in a shallow pot or pan. In this operation, the glass for each drawing is ladled from the main furnace and poured into the pot. After an article has been drawn, the chilled residue must be disposed of, which is usually done by heating it until it will flow readily, and then dumping or otherwise ejecting it from the pot, in order to clean the latter preparatory to receiving a charge for another drawing.

It has also been proposed to draw glass articles from a comparatively shallow pool of molten glass which is permitted to flow from the melting-tank upon a hearth or floor projecting from the tank somewhat below the surface of the body of glass in the latter, but the difficulty of maintaining such a shallow pool of glass at the proper temperature is very great.

In the practice of the present invention, wherein the glass articles are drawn from the deep body of molten metal in the tank itself, such heated body, by reason of its great mass and internal high temperature, substantially maintains itself in the proper condition, auxiliary heating devices being preferably employed locally above the surface of the glass, for the purpose of assisting in the regulation of the temperature of the immediate surface at any point, as may be found desirable.

Figure 2:
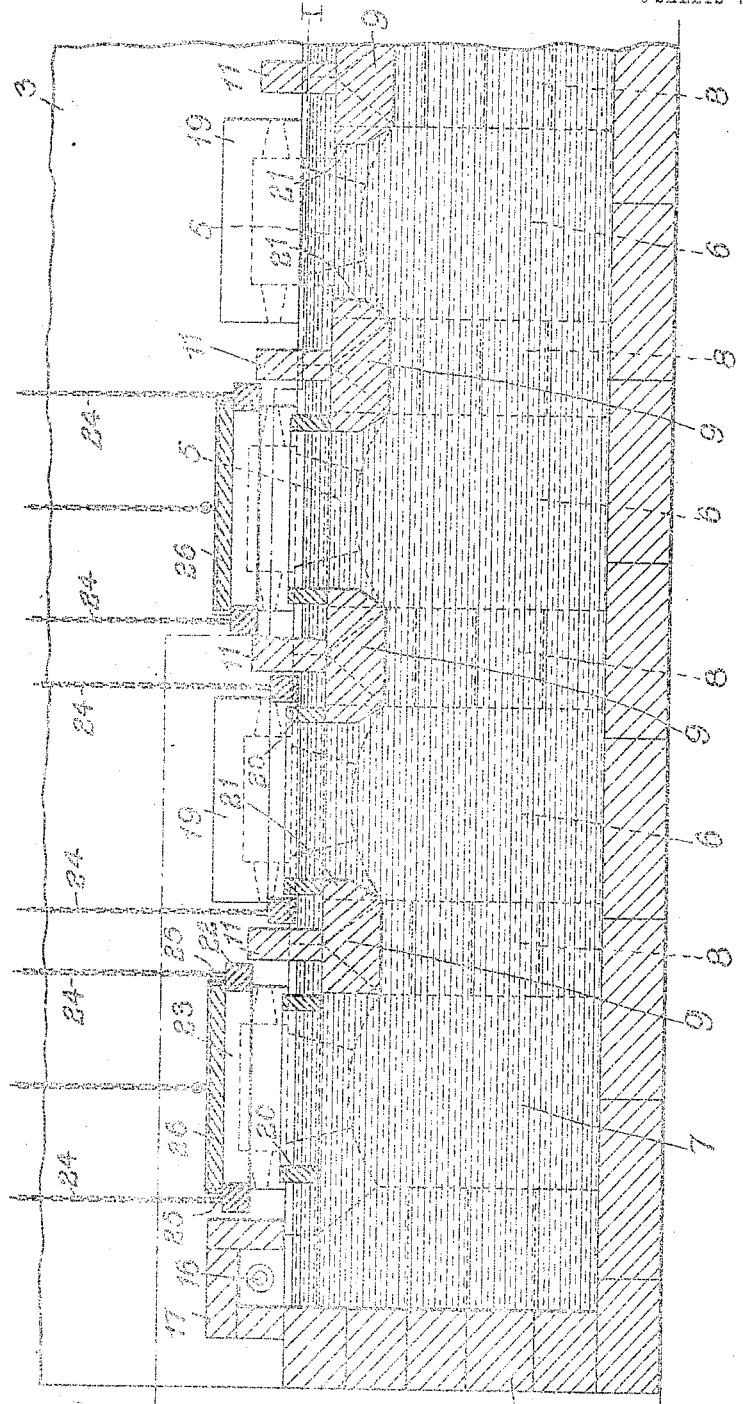
Figure 3:
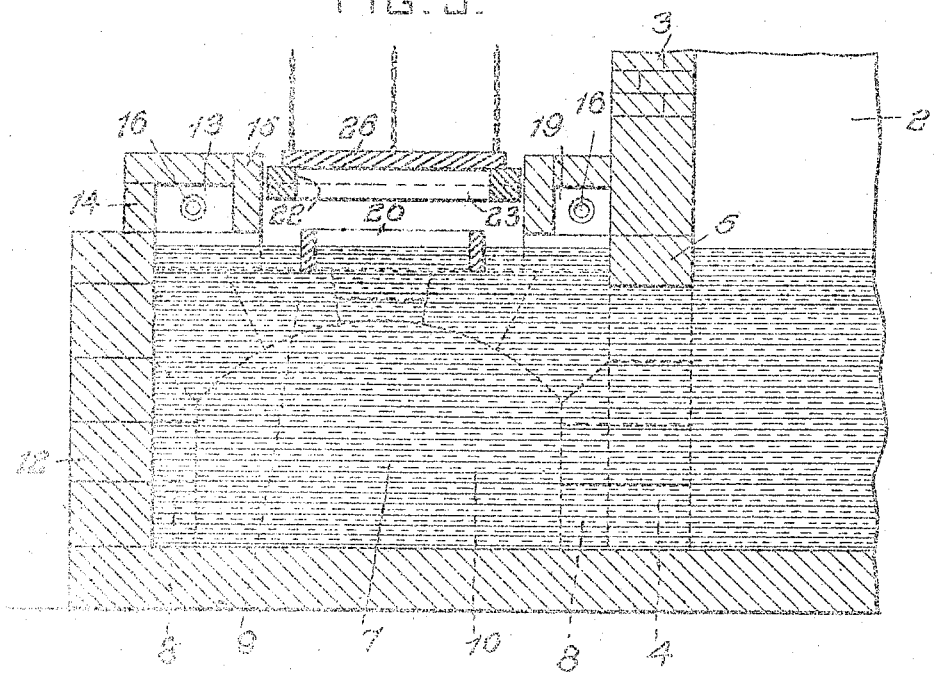
Figure 4:
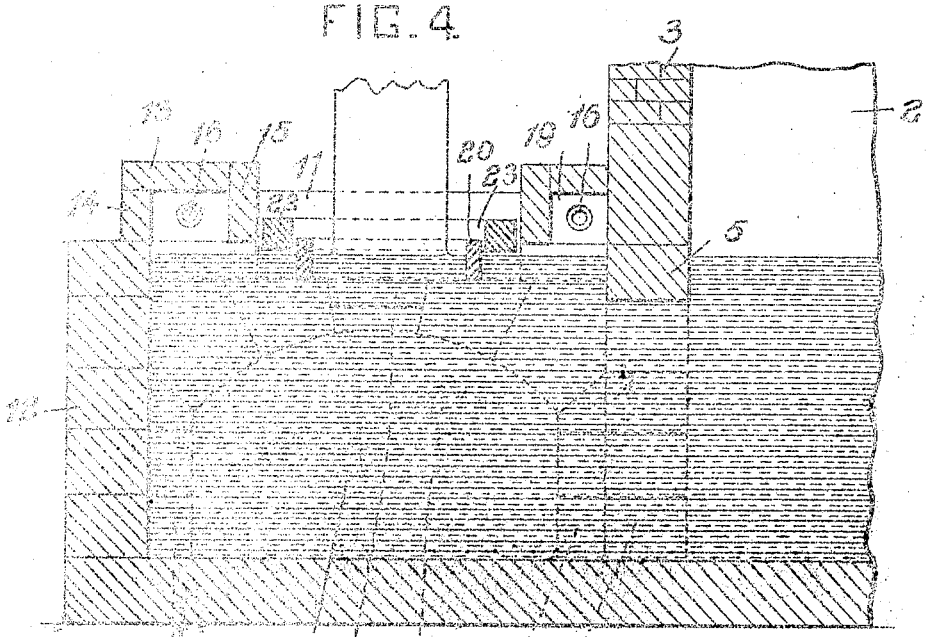

In the accompanying drawings I have illustrated a glass-melting furnace or tank suitable for the practice of the invention. Figure 1 is an irregular horizontal section of a portion of such a furnace on the line I—I, Fig. 2; Figure 2 is a transverse vertical section on the line II—II, Fig. 1; Figure 3 is a longitudinal vertical section on the line III—III, Fig. 1, showing sundry of the parts in one position, and Figure 4 is a similar section on the line IV—IV, Fig. 1, showing the parts in another position; Figure 5 is a plan view showing a modification, and Figures 6 and 7 are sectional views on the line VI—VI of Fig. 5, showing the parts in different positions; Figure 8 is a view similar to Fig. 6 showing a further modification.

The body of glass in the usual melting-end 2 of the large furnace or tank 1, is melted and maintained in molten condition by heat generated and applied in any suitable way, as for instance, by the well-known system of flues and regenerators for gas and air arranged in the customary manner at the opposite sides of the furnace, not shown. At the front of the melting-end the roof of the furnace is cut away, and the wall 3 extends downwardly preferably below the surface of the glass, being supported upon pedestals 4, with intervening arches 5, forming a series of wide openings 6 in the wall 3 below the surface of the glass, through which the molten metal freely flows into the drawing-end 7, which preferably extends entirely across the front of the furnace.

Pedestals 8 are preferably arranged on opposite sides of the drawing end 7 in pairs in line with the pedestals 4, between which are built the transverse arches 9 below the level of the glass, forming a series of wide openings 10 at intervals along the drawing-end. Thinner walls 11 are built upon the arches 9 and project above the surface of the glass, thus dividing the upper portion of the drawing-end into a series of surface compartments, while the body below, by means of the wide openings 10, forms a unitary reservoir open from end to end, which has free communication with the melting-end 2 of the furnace through the wide openings 6. The numeral 12 indicates the front wall of the furnace.

Along the outer wall 12 I preferably arrange small heating-chambers 13 above the surface of the glass in each compartment. The side-walls 14 of these local heating-chambers are supported upon the outer row of pedestals 8, and their inner walls 15 form curtains extending down near to, but preferably not below, the surface of the glass. The walls 15 may however, if desired, be made to project below the surface of the glass. Burners 16 for the introduction of gaseous fuel are arranged in any desired number and location in the walls of the heating-chambers.

By means of the heating-chambers 13 I am enabled to accurately regulate the temperature of the immediate surface of the glass, since the burners 16, or any of them, may be turned off or on, or adjusted, at will.

I have found the use of these local heating-chambers to be of particular advantage along the outside wall 12, where there is some tendency of the glass to chill, and for this reason I also preferably place similar chambers 17 on the walls 18 of the drawing-end, (only one end being shown in the drawings).

I have also shown in the drawings a series of like heating-chambers 19 arranged along the inner line of the compartments over the surface of the glass above the respective openings 6.

These local heating-chambers may however be arranged at any desired point or points, or in some cases may be omitted altogether, since I have intended to illustrate in the drawings merely an arrangement which has been found to give very satisfactory results.

In the surface of the glass in the center of each compartment I place a ring 20 of refractory material, which projects slightly above the surface of the glass. This ring may be made to float, but I prefer to make it of such weight that its opposite edges may rest upon ledges 21 which are preferably made to project for that purpose from the arches 9.

The rings 20 are employed to segregate, without separating, the immediate portion of the surface of the glass from which the articles are drawn, from the large body of glass in the drawing-end. The surface within the ring is kept free of any floating impurities, and its temperature can be more accurately regulated and controlled. The ring also, in conjunction with the other members with which it is combined, performs the important function to be hereinafter mentioned, of properly directing the heat of the furnace upon and around the surface of the article being drawn, in order to prevent a too fast or abrupt chilling of the latter.

Above the exposed surface of the glass outside of the ring in each compartment is suspended the vertically-movable top-stone 22, which is provided with a central opening 23 which is preferably of a diameter slightly greater than the outside diameter of that portion of the ring which projects above the surface of the glass. The top-stone 22 is suspended by any suitable means, as by chains 24 attached to eye-bolts 25 on opposite sides of the top-stone, and connected to any suitable means for alternately raising the top-stone to the position shown in Figure 3, and lowering it to the position shown in Figure 4, slightly above the surface of the glass. A cover 26 is provided for the opening in the top-stone when the latter is in its elevated position. When in elevated position the top-stone and cover serve to reflect the heat of the body of the glass, and that from the local heating-chambers, directly upon the surface of the glass within the ring, so as to bring it to the desired uniform temperature. When the top-stone is lowered and the cover removed, the surface of the glass within the ring is exposed to the unimpeded cooling action of the atmosphere, and is thereby slightly chilled to the condition best adapted for the formation of the article to be drawn. During the drawing of the article, see Figure 4, the top-stone and the ring, acting in conjunction, serve to direct the heat of the furnace upwardly around the article. This has been found to be very beneficial, since otherwise the article will often chill too quickly or abruptly, and break; while by subjecting the article to the heat permitted to escape from the furnace, it is allowed to cool more gradually and is somewhat annealed during the drawing operation.

In Figure 4 I have shown the lower portion of a cylinder being drawn from the glass within the ring, it being understood that any suitable drawing mechanism may be employed, the drawing being performed by the usual or any desired form of bait, and air or other fluid supplied to the article through the bait or in any other suitable way. In drawing articles of other form, such as a sheet, the opening in the top-stone and the ring will be modified accordingly.

In Figures 5, 6 and 7 I have illustrated what may be one of a series of separate drawing-chambers arranged along the wall of the melting-end in any desired manner, and in open communication with the body of the molten glass in the melting-end, the form and arrangement of the parts being otherwise substantially the same as has been already described.

Figure 8 is a view similar to Figure 6 illustrating a further modification, in which the burners in the inner local heating-chamber or chambers 19 are dispensed with, and an opening or openings cut through the wall 3 of the melting-end, so that the heat from the melting-end may be used instead of the burners. Means, such as the vertically sliding valve or damper 28, are provided for closing the opening 27 when the top-stone is lowered, so as to cut off the supply of heat from the melting-end during the drawing operation. Or the damper 28 may be omitted, and the edge of the top-stone, (provided with the upwardly projecting plate 29 if necessary), will serve the same end.

Since the present invention resides in the method of manufacture hereinafter set forth in the claims, other modifications in the furnace structure and apparatus may be made without departure from the scope thereof, and it may also be practiced in the employment of other and different forms of furnace and apparatus. The furnace herein shown and described is made the subject of a separate application for Letters Patent.

In order to attain the best results the molten glass in the furnace should be maintained at a substantially constant depth and surface level.

In the practice of the invention in connection with the furnace shown and described, the top-stone being in the elevated position shown in Figure 3, and its central opening closed by the cover, the surface of the glass which is segregated within the ring is heated uniformly to the desired temperature by the internal heat of the body of glass itself, and the heat reflected downwardly from the top-stone and cover.

The top-stone is then lowered to the position shown in Figure 4 and the cover removed, and the surface of the glass within the ring is thus exposed to the unimpeded cooling action of the atmosphere. The surface of the glass is thereby chilled sufficiently to form a film or skin of the temperature which, as is well known, is best adapted to the formation of the article to be drawn.

Meanwhile the bait has been lowered, and the surface of the glass being now in proper condition, and in adhering engagement with the bait, the article is drawn upwardly from the glass within the ring in the well-known manner.

Where single articles are being drawn, when the desired length has been reached, the lower end of the article is severed from the bath in any desired way, a number of which are now well known. To this end I prefer to discontinue the drawing and elevate the top-stone, when the lower end of the article will be quickly melted away. The article is then removed, the cover replaced over the opening in the top-stone, and the surface of the glass within the ring reheated as before.

In the arrangement shown in Figures 1 and 2 a number of articles may be drawn simultaneously, or they may be drawn from the compartments of the drawing-end in any desired order or sequence.

I claim as my invention:

1. The method of manufacture of glass articles by drawing from a deep body of molten glass, which consists in segregating a portion of the surface of the glass without detaching it from the body beneath, heating said segregated portion to a temperature above that required for drawing, cooling said segregated portion by exposure to the atmosphere to a proper temperature for drawing, and then drawing the article upwardly therefrom.

2. The method of manufacture of glass articles by drawing from a deep body of molten glass, which consists in segregating a portion of the surface of the glass without detaching it from the body beneath, heating said segregated portion to a temperature above that required for drawing, then cooling it to the desired consistency for drawing, and then drawing the article upwardly therefrom.

3. The method of manufacture of glass articles by drawing from a deep body of molten glass, which consists in segregating a portion of the surface of the glass without detaching it from the body beneath, drawing a succession of articles from said segregated portion, first reheating to a temperature above that required for drawing and then cooling said segregated portion to a proper temperature for drawing by exposure to the atmosphere after the drawing of each article, and maintaining the body of molten glass at a substantially constant depth throughout the operation.

4. The method of manufacture of glass articles by drawing from a deep body of molten glass, which consists in segregating a portion of the surface of the glass without detaching it from the body beneath, drawing a glass article upwardly from said segregated portion, and directing the heat of the glass outside of said segregated portion upwardly into contact with the article during the drawing operation.

5. The method of manufacture of glass articles by drawing from a deep body of molten glass, which consists in segregating a portion of the surface of the glass without detaching it from the body beneath, applying heat to the surface of the body of glass, cooling said segregated portion of the surface while still maintaining the glass outside of said segregated portion in highly heated condition, drawing a glass article upwardly from said segregated portion, and directing the heat applied to the glass outside of said segregated portion upwardly into contact with the article during the drawing operation.

In testimony whereof, I have hereunto set my hand.

HARRY G. SLINGLUFF.

Witnesses:
 CHARLES BARNETT,
 FRANCIS J. TOMASSON.